United States Patent
Reith

(10) Patent No.: US 9,181,416 B2
(45) Date of Patent: Nov. 10, 2015

(54) STABILISER COMBINATIONS FOR HALOGENATED POLYMERS

(75) Inventor: Walter Reith, Egenhofen (DE)

(73) Assignee: IKA INNOVATIVE KUNSTSTOFFAUFBEREITUNG GMBH & CO. KG, Wolfen (DE)

( * ) Notice: Subject to any disclaimer, the term of this patent is extended or adjusted under 35 U.S.C. 154(b) by 640 days.

(21) Appl. No.: 13/502,130

(22) PCT Filed: Sep. 24, 2010

(86) PCT No.: PCT/EP2010/064133
§ 371 (c)(1),
(2), (4) Date: Apr. 14, 2012

(87) PCT Pub. No.: WO2011/045168
PCT Pub. Date: Apr. 21, 2011

(65) Prior Publication Data
US 2012/0208941 A1    Aug. 16, 2012

(30) Foreign Application Priority Data
Oct. 14, 2009 (DE) .......................... 10 2009 045 701

(51) Int. Cl.
| C08K 3/18 | (2006.01) |
| C08K 5/00 | (2006.01) |
| C08K 5/16 | (2006.01) |
| C09K 15/32 | (2006.01) |
| C09K 15/02 | (2006.01) |
| C09C 1/02 | (2006.01) |
| C09C 1/00 | (2006.01) |
| C09C 3/06 | (2006.01) |

(52) U.S. Cl.
CPC ... *C08K 5/16* (2013.01); *C08K 3/18* (2013.01); *C08K 5/0091* (2013.01); *C09C 1/0081* (2013.01); *C09C 1/02* (2013.01); *C09C 3/06* (2013.01)

(58) Field of Classification Search
CPC .......... C08K 3/18; C08K 5/0091; C08K 5/16; C09C 1/02
See application file for complete search history.

(56) References Cited

U.S. PATENT DOCUMENTS

| 5,124,373 A * | 6/1992 | Baumgaertel et al. ........ 523/210 |
| 2005/0107504 A1* | 5/2005 | Norris ............................ 524/300 |
| 2006/0014874 A1 | 1/2006 | Ito et al. |
| 2008/0227895 A1* | 9/2008 | Ito et al. ........................ 524/101 |
| 2009/0156722 A1* | 6/2009 | Khanna et al. ................ 524/230 |
| 2011/0275747 A1* | 11/2011 | Hacker et al. ................. 524/211 |

FOREIGN PATENT DOCUMENTS

| DE | 102008020203 | 10/2009 |
| EP | 0457471 | 11/1991 |
| EP | 0945483 | 9/1999 |
| EP | 2072567 | 6/2009 |
| EP | 2110405 | 10/2009 |
| WO | 02092686 | 11/2002 |
| WO | 02094919 | 11/2002 |
| WO | 2004048453 | 6/2004 |
| WO | 2005059027 | 6/2005 |

* cited by examiner

*Primary Examiner* — Joseph D Anthony
(74) *Attorney, Agent, or Firm* — Klauber & Jackson LLC

(57) ABSTRACT

The invention relates to a stabilizer system comprising a thermal stabilizer and a supported, at least partly calcined dolomite of the formula $Mt^1X^1 \cdot CaX^2$ where $Mt^1$=Mg or Zn; $X^1$=O or $(OH)_2$; $X^2$=O; $(OH)_2$ or $CO_3$, wherein the calcined dolomite has been supported with a metal perchlorate of the formula $Mt^2(ClO_4)_m \cdot nH_2O$ where $Mt^2$=Li, Na, K, Mg, Ca, Ba, Zn, Al, La, Ce; m=1, 2 or 3, m being selected so as to compensate for the charge of the metal ion $Mt^2$; n=0 to 3 and wherein the stabilizer system does not comprise any of the compounds selected from the group consisting of (B) and (C) when $Mt^1$ is Mg, and wherein (B) at least one nitrogen-containing organic compound is selected from the group consisting of (B1) and (B2), (B1) being a tert-alkanolamine and (B2) being an enaminone or a urea, and (C) an alkaline earth metal aluminohydroxocarbonate of the formula (C) $(M_{1-x}Zn_x)_yAl_2(OH)_{4+2y}CO_3 \cdot zH_2O$ (C) where M=magnesium or/and calcium; x=0 to 0.5; y=2 to 8 and z=0 to 12. The invention further relates to compositions and articles comprising the stabilizer system, to the use thereof and to processes for production of the supported dolomite.

13 Claims, No Drawings

STABILISER COMBINATIONS FOR HALOGENATED POLYMERS

CROSS REFERENCE TO RELATED APPLICATIONS

The present application is a National Stage Application claiming the priority of co-pending PCT Application No. PCT/EP2010/064133 filed Sep. 24, 2010, which in turn, claims priority from German Application Serial No. 10 2009 045 701.1 filed Oct. 14, 2009. Applicants claim the benefits of 35 U.S.C. §120 as to the PCT application and priority under 35 U.S.C. §119 as to the said German application, and the entire disclosures of both applications are incorporated herein by reference in their entireties.

The invention relates to a stabilizer system comprising a thermal stabilizer and a supported, at least partly calcined dolomite. The invention further relates to compositions and articles comprising the stabilizer system, to the use thereof and to processes for production of the supported dolomite.

The invention is versatile and serves, particularly at standard processing temperatures, to improve the performance of metal stabilizers such as calcium-zinc, barium-zinc, organotin and lead stabilizers. However, it is also possible to optimize the action profile of entirely heavy metal-free stabilizers, called organic-based stabilizers, preferably enaminone-based stabilizers. In addition, the invention enables an improvement in the long-term stability of motor vehicle components made of polyvinyl chloride at moderately elevated temperatures, especially when they are employed in combination with polyurethane resins.

The problem of adequately stabilizing polyvinyl chloride at those temperatures at which the polymer is flexible or fluid enough to enable shaping has to date been solved adequately by the addition of various combinations of thermal stabilizers. At the processing temperatures, however, the resin can be degraded with autocatalytic release of hydrogen chloride, and become discolored or brittle or adhere to machine parts. These problems have been solved to date by adding one or more thermal stabilizers to the polymer prior to or during processing. These are stabilizers based on calcium-zinc, barium-zinc, organotin and/or lead, and/or organic-based stabilizers.

Even though the existing thermal stabilizers enable adequate stabilization of the polymer at elevated processing temperatures, they cannot impart adequate stabilization to the polymer of which the finished article consists at lower temperatures over a prolonged period. For example, protection from discoloration at lower temperatures over long periods is a specific problem in the case of motor vehicle components formed from polyvinyl chloride, even though thermal stabilizers have been added thereto prior to or during processing. According to the position in the vehicle, these moldings can be exposed during service life to varying incidences of light and elevated temperatures (higher than standard temperature); this phenomenon can impair the properties of motor vehicle components to different degrees. In the case of polyvinyl chloride moldings which have been backfoamed with polyurethane, for example in the case of car dashboards, gloveboxes, door handles, armrests and headrests, the amine component from the polyurethane can additionally contribute to discoloration and impairment of the service properties of the polyvinyl chloride moldings.

For instance, there have been proposals of stabilizers which impart stability to the polyvinyl chloride molding backfoamed with polyurethane in the event of moderate heat over prolonged periods, or with respect to an amine from the polyurethane.

For example, EP-A 212 559 discloses combinations of sterically hindered amines (HALS compounds) and ammonium perchlorate, amine perchlorate or metal perchlorate, which impart a certain stability to the polyvinyl chloride resin. This publication also describes the use of such compositions for stabilization of polyurethane-backfoamed polyvinyl chloride moldings.

U.S. Pat. No. 4,861,816 discloses polyvinyl chloride compositions which comprise a stabilizer mixture composed of particular barium/zinc carboxylates and a hydrotalcite perchlorate. According to the patent specification, the use of this hydrotalcite compound gives rise to good amine stability, especially also in the case of PVC moldings backfoamed with polyurethane.

However, the handling of many perchlorate salts is problematic, since they are an explosion risk or are strong oxidizing agents. However, serious disadvantages in the course of processing are the high melting points and the inadequate dispersibility in the polymer. The incompatibility thereof with other additives should also be mentioned.

Repeated efforts have been made in the last few years to improve polymer compatibility and dispersibility in the polymer, but without entirely satisfactory results.

For instance, EP-A 457 471 describes a combination of primary thermal stabilizer and a secondary thermal stabilizer, comprising calcium silicate supported with sodium perchlorate monohydrate solution.

EP-A 768 336 describes perchlorate salts in combination with 6-aminouracil, and the perchlorate salts may also be supported on zeolites or hydrotalcites. WO-A 02/092686 discloses zinc-free zeolite- and hydrotalcite-perchlorate combinations with antioxidants, alkali metal/alkaline earth metal carboxylates, 1,3-diketones and dihydropyridine compounds (DHP), and it can be inferred from the description that these are perchlorate-supported zeolites and hydrotalcites.

DE-A 101 24 734 describes perchlorate-supported calcium hydroxide as a stabilizer for PVC, said calcium hydroxide being produced by way of example from aqueous sodium perchlorate solution and calcium oxide.

DE-A 102 55 155 describes perchlorate-supported calcium aluminum hydroxo hydrogenphosphites as stabilizers for PVC, but the production is not documented by examples.

WO-A 2008/061664 describes calcium carbonato hydroxo dialuminate combinations with perchlorate salts, and the description discloses that sodium perchlorate-supported products are also possible.

The situation is also the same for WO-A 2008/061665, wherein perchlorate supporting of zinc-containing calcium-aluminum double salts is disclosed.

A common feature of the last six publications mentioned is that supporting of metal perchlorate salts on inorganic support substances is described.

European patent application with application number EP 09 157 705.6, which was yet to be published at the priority date of the present application, discloses aqueous sodium perchlorate solutions supported on calcined dolomite, this product being disclosed as a stabilizer component in combination with enaminones, tert-alkanolamines or ureas, or particular alkaline earth metal aluminohydroxocarbonates.

However, none of the aforementioned proposals is entirely satisfactory in terms of the way it works.

It is accordingly an object of the present invention to provide an improved perchlorate salt stabilizer composition, with emphasis on enhancing the performance of primary thermal stabilizers such as metal stabilizers, examples being calcium-zinc, barium-zinc, organotin and lead stabilizers, but also of entirely heavy metal-free stabilizers, called organic-based stabilizers, preferably enaminone-based stabilizers, at standard processing temperatures, and also on improving the stabilization of PVC resin compositions, especially when they are in contact with polyurethanes, in order to retard the degradation of the polymer at moderate temperatures acting over a long period.

The object is achieved by a stabilizer system comprising a thermal stabilizer and a supported, at least partly calcined dolomite of the formula:

$$Mt^1X^1*CaX^2$$

where
$Mt^1$=Mg or Zn;
$X^1$=O or $(OH)_2$;
$X^2$=O; $(OH)_2$ or $CO_3$,
wherein the calcined dolomite has been supported with a metal perchlorate of the formula $$Mt^2(ClO_4)_m*nH_2O$$

where $Mt^2$=Li, Na, K, Mg, Ca, Ba, Zn, Al, La, Ce;
m=1, 2 or 3, m being selected so as to compensate for the charge of the metal ion $Mt^2$;
n=0 to 3,
and wherein the stabilizer system does not comprise any of the compounds selected from the group consisting of (B) and (C) when $Mt^1$ is Mg, and wherein
(B) at least one nitrogen-containing organic compound is selected from the group consisting of (B1) and (B2), (B1) being a tert-alkanolamine and (B2) being an enaminone or a urea, and
(C) an alkaline earth metal aluminohydroxocarbonate of the formula (C)

$$(M_{1-x}Zn_x)_yAl_2(OH)_{4+2y}CO_3*zH_2O \quad (C)$$

where M=magnesium or/and calcium; x=0 to 0.5; y=2 to 8 and z=0 to 12.

Compounds (B) and (C) in combination with Mg—Ca dolomites are described in European patent application with the application number EP 09 157 705.6, which was yet to be published at the priority date of the present application.

The invention encompasses a composition composed of a (primary) thermal stabilizer, in order typically to give stability at processing temperatures of 150 to 205° C., and typically 0.1 to 10 parts by weight, based on the resin, and of a secondary stabilizer which consists of a mixture of an aqueous metal perchlorate salt solution and a calcined dolomite, in order to impart additionally improved long-term thermal stability to the PVC.

The combination of aqueous metal perchlorate salt solution with calcined dolomite gives a product which is safer to handle. For instance, it is no longer impact- or shock-sensitive and is no longer an explosion risk in the course of heating. In addition, it no longer acts as an oxidizing agent. It has additionally been found that a combination of aqueous metal perchlorate salt solutions with calcined dolomite additionally comprising a nonabsorbent diluent powder, for example calcium carbonate, gives rise to a free-flowing powder composition.

The metal perchlorate salts correspond to the general formula (I):

$$Mt(ClO_4)_m*nH_2O \quad (I)$$

where Mt=$Mt^{(+)}$, $Mt^{(2+)}$, $Mt^{(3+)}$ and m=1, 2, 3; n=0-3
where $Mt^{(+)}$=Li, Na, K; $Mt^{(2+)}$=Mg, Ca, Ba, Zn; $Mt^{(3+)}$=Al, La, Ce.

Preference is given to $NaClO_4*H_2O$ (sodium perchlorate monohydrate).

At least partly calcined dolomites correspond to the general formula (II):

$$MtX_1*CaX_2 \quad (II)$$

where Mt=Mg or/and Zn and $X_1$ or $X_2$=O or $(OH)_2$ and $X_2$ is also $CO_3$.

The double salt MgO*CaO corresponds to the normal (fully) calcined magnesium dolomite. ZnO*CaO corresponds to calcined zinc dolomite (minrecordite). MgO*CaO is also known as fully calcined dolomite, $MgO*CaCO_3$ as partly calcined dolomite. $Mg(OH)_2*Ca(OH)_2$ is the hydration product of fully calcined magnesium dolomite MgO*CaO.

Calcined magnesium dolomites are preferred, very particular preference being given to MgO*CaO.

The production of fully and partly calcined magnesium dolomites is described in EP-A 2 072 567. Product properties are also published therein.

The combination of aqueous metal perchlorate salt solution and calcined dolomite of the present invention comprises generally 1 to 60% by weight, preferably 10 to 60% by weight, more preferably 10 to 30% by weight, of a preferably 5 to 80% by weight, more preferably 15-80% by weight, even more preferably 30-80% by weight, even more preferably 45-80% by weight, even more preferably 60-75% by weight, aqueous solution of metal perchlorate hydrate, preferably of sodium perchlorate monohydrate, and 40 to 90% by weight, preferably 70 to 90% by weight, of calcined dolomite. More preferably, the compositions of sodium perchlorate with calcined dolomite comprise 15 to 25% by weight of a 60 to 75% by weight aqueous solution of sodium perchlorate monohydrate and 75 to 85% by weight of calcined dolomite. Free-flowing powder compositions are produced by combining 15% by weight of a 60 to 75% by weight aqueous solution of sodium perchlorate monohydrate, 40% calcined dolomite and 45% calcium carbonate.

It is therefore preferred that the metal perchlorate content of the aqueous solution is 5 to 80% by weight, more preferably 15-80% by weight, even more preferably 30-80% by weight, even more preferably 45-80% by weight, even more preferably 60 to 75% by weight.

It is therefore preferred that the proportion of the metal perchlorate solution is 1 to 60% by weight, further preferably 10 to 60% by weight, more preferably 10 to 30% by weight, based on the total weight of the supported dolomite.

The proportion of the supported calcined dolomite is preferably 0.001 to 30% by weight, more preferably 0.001 to 15% by weight, even more preferably 0.01 to 5% by weight, based on the total amount of the stabilizer system.

Accordingly, the present application further provides a process for producing a calcined supported dolomite as defined above, comprising the steps of
(a) providing an at least partly calcined dolomite of the formula $Mt^1X^1*CaX^2$
where
$Mt^1$=Mg or Zn;
$X^1$=O or $(OH)_2$;
$X^2$=O; $(OH)_2$ or $CO_3$;
(b) supporting the dolomite with an aqueous metal perchlorate solution, the metal perchlorate having the formula $$Mt^2(ClO_4)_m*nH_2O$$

where $Mt^2$=Li, Na, K, Mg, Ca, Ba, Zn, Al, La, Ce;
m=1, 2 or 3, m being selected so as to compensate for the charge of the metal ion $Mt^2$;
n=0 to 3
(c) optionally drying the supported dolomite.

The metal perchlorate content of the aqueous solution is preferably 60 to 75% by weight.

Preferably, the proportion of the metal perchlorate solution is 10 to 60% by weight, preferably 10 to 30% by weight, based on the total weight of the supported dolomite.

The stabilizer composition obtained from aqueous metal perchlorate salt solution and calcined dolomite is obtainable, for example, by mixing a solution of preferably sodium perchlorate in water (for example about 60% by weight of sodium perchlorate or more), as commercially available, for example, from ARKEMA, with calcined dolomite, for example CeM-iX_115, from BENE_FIT Systems GmbH & Co. KG, Hirschau, Germany.

It has been found that calcined dolomite in combination with the sodium perchlorate solution, compared to the use of sodium perchlorate alone, not only ensures long-term thermal stability but is also capable of absorbing the water in the sodium perchlorate solution to give a sodium perchlorate stabilizer composition which is relatively easy to handle and harbors fewer risks.

Perchlorate salt solutions can be mixed with calcined dolomite on the industrial scale by spray granulation. The spray agglomeration is performed by methods known to those skilled in the art and can be effected in a spray dryer, spray granulator (top spray or bottom spray, countercurrent method), fluidized bed granulator, or in a mixer or horizontal dryer, the water being removed from the perchlorate salt solution until a product with the desired residual moisture content is obtained. The latter can be established by methods known to those skilled in the art. Particular mention should be made of the parameters of temperature and air flow rate for production of the granules. Details of the process for spray agglomeration can be found, for example, in the chapter by Hans Mollet, Arnold Grubenmann, Formulation Technology—Emulsions, Suspensions, Solid Forms, Wiley-VCH 2001, chapter 6.2, pages 190 to 226.

The spray agglomeration preferably takes place in a reactor in which the support material (calcined dolomite) is sprayed in as a suspension with perchlorate salt solution, in the course of which coating of the support material takes place with hydration of the oxides to hydroxides. The air flow enables rapid drying of the coated material with subsequent agglomeration of the primary particles.

This process works very gently since the product is formed under mild conditions.

The spray drying can likewise be effected from an aqueous suspension, the mixture of calcined dolomite and perchlorate salt solution being sprayed as a slurry, preferably in a top spray granulator.

The temperature in the reactor in the course of spray agglomeration is preferably constant and is in the range from 20° C. to 120° C., preferably 40° C. to 70° C., at an air feed temperature which is then typically in the range from 70° C. to 170° C., preferably in the range from 90° C. to 120° C.

In practice—as already mentioned—the combinations of sodium perchlorate and calcined dolomite are used in combination with primary thermal stabilizers. The amount of the composition of sodium perchlorate and calcined dolomite used in the present invention is especially 0.5 to 5 parts by weight, based on the weight of the halogenated polymer, as of a polyvinyl chloride resin.

To the primary thermal stabilizers are tin stabilizers such as organotin mercaptides, organotin sulfides and organotin carboxylates and mixtures thereof, lead salts, metal salt stabilizers such as calcium salts, magnesium salts, barium salts, zinc salts and mixtures thereof. These stabilizers are normally used in an amount of 0.01 to 10% by weight of the resin, preferably in an amount of 0.1 to 5% by weight.

Tin Stabilizers

Examples of suitable organotin stabilizers include alkyltin mercaptides, for example monomethyltin tris(isooctylthioglycolate), dimethyltin bis(isooctylthioglycolate), monomethyltin tris(2-ethylhexylthioglycolate), dimethyltin bis(2-ethylhexylthioglycolate), monobutyltin tris(isooctylthioglycolate), dibutyltin bis(isooctylthioglycolate), monobutyltin tris(2-ethylhexylthioglycolate), dibutyltin bis(2-ethylhexylthioglycolate), monomethyltin tris(mercaptoethyltallate), dimethyltin bis(mercaptoethyltallate), dibutyltin bis(mercaptoethyltallate), monobutyltin tris(mercaptoethyllaurate), dibutyltin bis(mercaptoethyllaurate), monomethyltin bis(isooctyl-3-mercaptopropionate), dimethyltin bis(isooctyl-3-mercaptopropionate), monobutyltin tris(isooctyl-3-mercaptopropionate) and dibutyltin bis(isooctyl-3-mercaptopropionate); alkyltin sulfides, for example monomethyltin sulfide, dimethyltin sulfide, monobutyltin sulfide and dibutyltin sulfide; alkyltin carboxylates, for example dimethyltin dilaurate, dibutyltin dilaurate, dibutyltin dioctanoate, dibutyltin dodecanoate, dibutyltin neodecanoate, dibutyltin dilaurate, dibutyltin ditallate, dioctyltin maleate and dibutyltin bis(dodecylmaleate); and mixtures thereof and lauryltin and ester-tin stabilizers.

Lead Stabilizers

Suitable lead-containing stabilizers in the context of the present invention are in principle all organic or inorganic lead compounds. Particularly suitable examples are basic lead salts of inorganic acids such as tribasic lead sulfate, tetrabasic lead sulfate, dibasic lead phosphite or dibasic lead phosphite sulfite or lead carbonate (lead white), lead salts of linear or branched, saturated or unsaturated, aliphatic or araliphatic or aromatic organic monocarboxylic acids, such as acetic acid, propionic acid, butyric acid, valeric acid, hexanoic acid, enanthic acid, octanoic acid, neodecanoic acid, 2-ethylhexanoic acid, pelargonic acid, decanoic acid, undecanoic acid, dodecanoic acid (lauric acid), tridecanoic acid, myristic acid, palmitic acid, 3,6-dioxaheptanoic acid, 3,6,9-trioxadecanoic acid, behenic acid, benzoic acid, p-tert-butylbenzoic acid, isostearic acid, stearic acid, 12-hydroxystearic acid, 9,10-dihydroxystearic acid, oleic acid, butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, sorbic acid, cinnamic acid, acrylic acid, methacrylic acid, resin acid (abietic acid); dicarboxylic acids or monoesters thereof or hydroxycarboxylic acids such as oxalic acid, malonic acid, maleic acid, fumaric acid, tartaric acid, mandelic acid, malic acid, glycolic acid, polyglycoldicarboxylic acids having a degree of polymerization of about 10 to about 12, phthalic acid, isophthalic acid, terephthalic acid or hydroxyphthalic acid; tri- or tetracarboxylic acids or the mono-, di- or triesters thereof, such as hemimellitic acid, trimellitic acid, pyromellitic acid or citric acid, or dimerized or trimerized linoleic acid. Likewise suitable are cycloaliphatic carboxylic acids such as cyclohexanecarboxylic acid, tetrahydrophthalic acid, 4-methyltetrahydrophthalic acid, hexahydrophthalic acid, endomethylenetetrahydrophthalic acid or 4-methylhexahydrophthalic acid. Particularly suitable are neutral or basic lead stearate, lead white, tri- or tetrabasic lead sulfate, dibasic lead phosphite, dibasic lead phthalate or tetrabasic lead fumarate. Very particular preference is given to dibasic lead phosphite and tribasic lead sulfate.

Likewise suitable as lead compounds for stabilization are products obtainable by reaction of lead oxide with hydroxycarboxylic acids, for example dimethylolpropionic acid. Such compounds and the preparation thereof are described in EP-A 313 113. Preference is given to lead phosphite or sulfate or mixtures thereof with at least one organic lead compound, especially with a lead carboxylate, preferably lead stearate or lead oleate. Very particular preference is given to dibasic lead phosphite and tribasic lead sulfate and blends thereof with lead stearate or calcium stearate, or the combination thereof with calcium-zinc fatty acid carboxylates.

The content in an inventive stabilizer system of lead stabilizers is preferably at least 5% by weight, preferably 10 to 95% by weight, more preferably 20 to 90% by weight and most preferably 30 to 75% by weight. In the case of basic lead stabilizers, the base content varies preferably from 1:1 to 10:1.

The metal salt stabilizers include alkali metal and alkaline earth metal compounds, metal soaps and zinc compounds.

Alkali Metal and Alkaline Earth Metal Compounds

This is understood to mean principally the carboxylates of the acids described in the "Zinc compounds" chapter, but also corresponding oxides or hydroxides or carbonates. Also useful are mixtures thereof with organic acids. Examples are LiOH, NaOH, KOH, CaO, Ca(OH$_2$), MgO, Mg(OH)$_2$, Sr(OH)$_2$, Al(OH)$_3$, CaCO$_3$ and MgCO$_3$ (including basic carbonates, for example magnesia alba) and huntite, and also fatty acid salts of sodium and potassium. In the case of alkaline earth metal and zinc carboxylates, it is also possible to use adducts thereof with MO or M(OH)$_2$ (M=Ca, Mg, Sr or Zn), known as "overbased" compounds. Preference is given to using alkali metal, alkaline earth metal and/or aluminum carboxylates in addition to the inventive stabilizers.

Preference is given to magnesium hydroxide, magnesium acetylacetonate, calcium acetylacetonate and uncoated and coated calcium hydroxide. Very particular preference is given to coated calcium hydroxide (coating with fatty acids, for example palmitic and stearic acids or mixtures thereof).

Metal Soaps

Metal soaps are mainly metal carboxylates, preferably of relatively long-chain carboxylic acids. Familiar examples are stearates and laurates, and also oleates and salts of relatively short-chain aliphatic or aromatic carboxylic acids such as acetic acid, propionic acid, butyric acid, valeric acid, hexanoic acid, sorbic acid; oxalic acid, malonic acid, succinic acid, glutaric acid, adipic acid, fumaric acid, citric acid, benzoic acid, salicylic acid, phthalic acids, hemimellitic acid, trimellitic acid, pyromellitic acid.

Metals include: Li, Na, K, Mg, Ca, Sr, Ba, Zn, Al, La, Ce and rare earth metals. Often, what are called synergistic mixtures such as barium/zinc, magnesium/zinc, calcium/zinc or calcium/magnesium/zinc stabilizers are used. The metal soaps can be used individually or in mixtures. An overview of commonly used metal soaps can be found in Ullmanns Encyclopedia of Industrial Chemistry, 5$^{th}$ Ed., Vol. A16 (1985), p. 361 ff. Preference is given to magnesium, calcium and zinc soaps.

Preference is given to magnesium, calcium and zinc soaps. Very particular preference is given to magnesium and calcium laurate and magnesium and calcium stearate, and also zinc laurate and zinc stearate.

Zinc Compounds:

The organic zinc compounds with a Zn—O bond are zinc enolates, zinc phenoxides or/and zinc carboxylates. The latter are compounds from the group of the aliphatic saturated and unsaturated $C_{1-22}$-carboxylates, the aliphatic saturated or unsaturated $C_{2-22}$-carboxylates which are substituted by at least one OH group or whose chain is interrupted at least by one or more oxygen atoms (oxa acids), the cyclic and bicyclic carboxylates having 5-22 carbon atoms, the phenyl carboxylates which are unsubstituted, substituted by at least one OH group and/or $C_{1-16}$-alkyl-substituted, the phenyl $C_{1-16}$-alkylcarboxylates, or the optionally $C_{1-12}$-alkyl-substituted phenoxides, or abietic acid. Zn—S compounds are, for example, zinc mercaptides, zinc mercaptocarboxylates and zinc mercaptocarboxylic esters.

The following should be mentioned by name as examples: the zinc salts of the monovalent carboxylic acids such as formic acid, acetic acid, propionic acid, butyric acid, valeric acid, hexanoic acid, enanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, ricinoleic acid, 3,6-dioxaheptanoic acid, 3,6, 9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid, cinnamic acid, mandelic acid, glycolic acid; zinc salts of the divalent carboxylic acids or monoesters thereof, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, malic acid, salicylic acid, polyglycoldicarboxylic acid (n=10-12), phthalic acid, isophthalic acid, terephthalic acid and hydroxyphthalic acid; and the di- or triester of the tri- or tetravalent carboxylic acids, such as hemimellitic acid, trimellitic acid, pyromellitic acid, citric acid, and also what are called overbased zinc carboxylates or zinc laurylmercaptide, zinc thioglycolate, zinc thiosalicylate, zinc bis-i-octylthioglycolate, zinc mercaptopropionate, zinc thiolactate, zinc thiomalate, zinc bisoctylmercaptopropionate, zinc bisisooctylthiolactate and zinc bislaurylthiomalate.

The zinc enolates are preferably enolates of acetyl(acetyl) acetone, of benzoyl(acetyl)acetone, of dibenzoylmethane, and enolates of ethyl (acetyl)acetoacetate and ethyl benzoyl (aceto)acetate, and of dehydroacetic acid. In addition, it is also possible to use inorganic zinc compounds such as zinc oxide, zinc hydroxide, zinc carbonate, basic zinc carbonate or zinc sulfide.

Preference is given to neutral or basic zinc carboxylates of a carboxylic acid having 1 to 22 carbon atoms (zinc soaps), for example benzoates or alkanoates, preferably $C_8$-alkanoates, stearate, oleate, laurate, palmitate, behenate, versatate, hydroxystearates and -oleates, dihydroxystearates, p-tert-butylbenzoate or (iso)octanoate. Particular preference is given to stearate, oleate, versatate, benzoate, p-tert-butylbenzoate and 2-ethylhexanoate.

The metal soaps or mixtures thereof can be employed in an amount of, for example, 0.001 to 10 parts by weight, appropriately 0.01 to 8 parts by weight, more preferably 0.05 to 5 parts by weight, based on 100 parts by weight of PVC.

Further examples of metal stabilizers are barium di(nonylphenoxide), barium di(nonyl-o-cresoxide), calcium laurate, magnesium laurate, barium laurate, calcium ricinoleate, magnesium ricinoleate, barium ricinoleate, calcium myristate, magnesium myristate, barium myristate, barium benzoate, barium oxalate, barium malonate, barium maleate, barium tartrate, barium p-tert-butylbenzoate, barium succinate, barium glutarate, barium adipate, barium pimelate, barium suberate, barium azelate and barium sebacate, zinc laurate, zinc oxalate, zinc malonate, zinc maleate, zinc tartrate, zinc benzoate, zinc p-tert-butylbenzoate, zinc succinate, zinc adipate, zinc malate and zinc stearate. It is additionally possible to use mixtures of the above substances and/or other known metal salt stabilizers. For example, a 99:1 mixture (based on weight) of calcium benzoate or barium benzoate and zinc laurate, and a 6:1 mixture (based on weight) of calcium stearate or barium stearate and zinc laurate, are found to be useful.

As well as the thermal stabilizers, it is also possible to add antioxidants, for example phenolic antioxidants, which are normally used in an amount of 0.01 to 10% by weight, more frequently in an amount of 0.1 to 5% by weight, of the thermal stabilizer. In addition, it is possible to use epoxy compounds, for example epoxidized soybean oil, in amounts of 0.01 to 10% by weight of the polymer.

In addition to the metal stabilizers listed so far, it is also possible for further metal stabilizers to be present, namely:
   titanium-containing hydrotalcites
   lithium layer lattice compounds
   calcium aluminum hydroxo hydrogenphosphites
   zeolites
   dawsonites
   hydroxocarboxylate metal salts Titanium-Containing Hydrotalcites Titanium-containing hydrotalcites are described in the patent WO-A 95/21127. Compounds of this kind with the general formula $Al_aMg_bTi_c(OH)_d(CO_3)_e*m\ H_2O$, where a:b=1:1 to 1:10; 2≤b≤10; 0<c<5; 0≤m<5 and d and e are selected so as to form a basic, uncharged molecule, can likewise additionally be used.

Lithium Layer Lattice Compounds (Lithium Hydrotalcites)

Lithium-aluminum layer lattice compounds have the general formula:

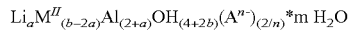

in which
$M^{II}$ is Mg, Ca or Zn and
$A^n$ is a selected anion of valency n or a mixture of anions and
   the indices are in the range of
0<a<(b-2)/2,
1<b<6 and
m=0 to 30,
with the restriction that (b-2a)>2 or
the general formula:

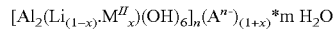

in which
$M^{II}$, A, m and n are each as defined above and
x fulfills the condition 0.01≤x<1.

The anions $A^n$ in the above general formula may be sulfate, sulfite, sulfide, thiosulfate, peroxosulfate, peroxodisulfate, hydrogenphosphate, hydrogenphosphite, carbonate, halide, nitrate, nitrite, hydrogensulfate, hydrogencarbonate, hydrogensulfite, hydrogensulfide, dihydrogenphosphate, dihydrogenphosphite, monocarboxylic acid anions such as acetate and benzoate, and also hydroxide, acetylacetonate, phenoxide, pseudohalide, halite, halate, perhalate, $I_3^-$, permanganate, anions of dicarboxylic acids such as phthalate, oxalate, maleate or fumarate, bisphenoxide, phosphate, pyrophosphate, phosphite, pyrophosphite and anions of tricarboxylic acids such as citrate, trisphenoxide and many others, and also mixtures thereof. Among these, preference is given to hydroxide, carbonate, phosphate and maleate. To improve the dispersibility of the substances in halogenated thermoplastic polymer compositions, they may be surface-treated with a higher fatty acid, for example stearic acid, an anionic surface-active agent, a silane coupler, a titanate coupler or a glyceryl fatty acid ester.

Calcium Aluminum Hydroxo Hydrogenphosphites (CHAP Compounds)

Compounds from the group of the basic calcium aluminum hydroxyl hydrogenphosphites suitable for the inventive stabilizer combinations are compounds of the general formula:

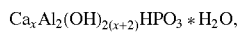

where x = 2-8 and

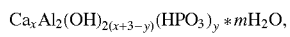

where x = 2-12, $$\frac{2x+5}{2} > y > 0$$

and m = 0-12, excluding y = 1 when x = 2-8.

When they are used as stabilizers, the dried calcium aluminum hydroxy phosphites do not release any water at the processing temperatures of 160-200° C. customary for rigid PVC, for example, such that no troublesome bubble formation occurs in the moldings.

To improve the dispersibility thereof in halogenated thermoplastic resins, the compounds can be coated with surfactants in a known manner. The compound class, also called CHAP or CAP compounds, is described in EP 0506831A1.

The above-described calcium aluminum hydroxo hydrogenphosphites and titanium-containing hydrotalcites may be present, apart from in crystalline form, also in semicrystalline and/or amorphous form.

Zeolites (Alkali Metal or Alkaline Earth Metal Aluminosilicates)

They can be described by the formula $M_{x/n}[(AlO_2)_x(SiO_2)_y]*w\ H_2O$ in which n is the charge of the cation M; M is an element of the first or second main group, such as Li, Na, K or $NH_4$ and Mg, Ca, Sr or Ba; y:x is a number from 0.8 to 15, preferably from 0.8 to 1.2; and w is a number from 0 to 300, preferably from 0.5 to 30.

Examples of zeolites are sodium aluminosilicates of the formulae $Na_{12}Al_{12}Si_{12}O_{48}*27\ H_2O$ [zeolite A], $Na_6Al_6Si_6O_{24}*2\ NaX*7.5\ H_2O$, X=OH, halogen, $ClO_4$ [sodalite]; $Na_6Al_6Si_{30}O_{72}*24\ H_2O$; $Na_8Al_8Si_{40}O_{96}*24\ H_2O$; $Na_{16}Al_{16}Si_{24}O_{80}*16\ H_2O$; $Na_{16}Al_{16}Si_{32}O_{96}*16\ H_2O$; $Na_{56}Al_{56}Si_{136}O_{384}*250\ H_2O$ [zeolite Y], $Na_{86}Al_{86}Si_{106}O_{384}*264\ H_2O$ [zeolite X]; $Na_2O, Al_2O_3, (2-5) SiO_2, (3.5-10)H_2O$ [zeolite P]; $Na_2O, Al_2O_3, 2SiO_2, *(3.5-10)\ H_2O$ (zeolite MAP); or the zeolites preparable by partial or full exchange of the Na atoms for Li, K, Mg, Ca, Sr or Zn atoms, such as $(Na,K)_{10}Al_{10}Si_{22}O_{64}*20\ H_2O$; $Ca_{4.5}Na_3[(AlO_2)_{12}(SiO_2)_{12}]*30\ H_2O$; $K_9Na_3[(AlO_2)_{12}(SiO_2)_{12}]*27\ H_2O$. Very particular preference is given to Na zeolite A and Na zeolite MAP (see also the patent U.S. Pat. No. 6,531,533). Equally preferred are zeolites with exceptionally small particle size, especially of the Na-A and Na-P type, as also described in the patent U.S. Pat. No. 6,096,820.

Dawsonites (Alkali Metal Aluminocarbonates)

These are described by the general formula

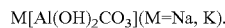

The preparation of Na dawsonite (DASC or SAC) and K dawsonite (DAPC) is published in the patent U.S. Pat. No. 3,501,264 and U.S. Pat. No. 4,221,771, and in the patent EP 0 394 670 A1. The synthesis can be effected by hydrothermal or non-hydrothermal means. The products may be crystalline or amorphous. Also included in the substance class are sodium magnesium aluminocarbonates (SMAC); the preparation thereof is described in the patent U.S. Pat. No. 455,055,284.

The hydrotalcites and/or calcium aluminum hydroxo hydrogenphosphites and/or zeolites and/or dawsonites can be employed in amounts of, for example, 0.1 to 20, appropriately 0.1 to 10 and especially 0.1 to 5 parts by weight, based on 100 parts by weight of halogenated polymer.

Hydroxycarboxylate Metal Salts

In addition, it is possible for hydroxycarboxylate metal salts to be present, where the metal may be an alkali metal or alkaline earth metal or aluminum. Preference is given to sodium, potassium, magnesium or calcium. The hydroxycarboxylic acid may be glycolic acid, lactic acid, malic acid, tartaric acid or citric acid, or salicylic or 4-hydroxybenzoic acid, or else glyceric acid, gluconic acid and sugar acid (see, for example, patent GB 1 694 873 and EP 1 303 564 A1).

In addition, it is possible to use other layer lattice compounds such as Li hydrotalcite. Further details on this subject can be found in the patent EP 0 930 332 A1. The synthesis of L-CAM perchlorate is described, for example, in the patent EP 0 761 756 A1.

Moreover, it is additionally possible to use metal-free costabilizers, namely:
glycidyl compounds
epoxidized fatty acid esters
phenol compounds
phosphites
sterically hindered amines
polyols
1,3-diketones
thiophosphites
mercaptocarboxylic esters Glycidyl Compounds They contain the glycidyl group:

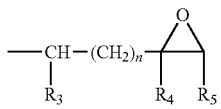

which is bonded directly to carbon, oxygen, nitrogen or sulfur atoms, and in which either $R_3$ and $R_5$ are both hydrogen, $R_4$ is hydrogen or methyl and n=0, or in which $R_3$ and $R_5$ together are —$CH_2$—$CH_2$— or —$CH_2$—$CH_2$—$CH_2$—, in which case $R_4$ is hydrogen and n=0 or 1.

I) Glycidyl and β-methylglycidyl esters obtainable by conversion of a compound having at least one carboxyl group in the molecule and epichlorohydrin or glyceryl dichlorohydrin or β-methylepichlorohydrin. The conversion is appropriately effected in the presence of bases.

The compounds having at least one carboxyl group in the molecule used may be aliphatic carboxylic acids. Examples of these carboxylic acids are glutaric acid, adipic acid, pimelic acid, suberic acid, azelaic acid, sebacic acid or dimerized or trimerized linoleic acid, acrylic and methacrylic acid, caproic acid, caprylic acid, lauric acid, myristic acid, palmitic acid, stearic acid and pelargonic acid, and the acids mentioned for the organic zinc compounds.

However, it is also possible to use cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

In addition, it is possible to use aromatic carboxylic acids, for example benzoic acid, phthalic acid, isophthalic acid, trimellitic acid or pyromellitic acid.

It is likewise also possible to use carboxyl-terminated adducts, for example of trimellitic acid and polyols, for example glycerol or 2,2-bis(4-hydroxycyclohexyl)propane.

Further epoxide compounds usable in the context of this invention can be found in EP 0 506 617.

II) Glycidyl or β-methylglycidyl ethers obtainable by conversion of a compound having at least one free alcoholic hydroxyl group and/or phenolic hydroxyl group and a suitably substituted epichlorohydrin under alkaline conditions, or in the presence of an acidic catalyst and subsequent alkali treatment.

Ethers of this type derive, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol, and from monofunctional alcohols such as isooctanol, 2-ethylhexanol, isodecanol, and $C_7$-$C_9$-alkanol and $C_9$-$C_{11}$-alkanol mixtures.

However, they also derive, for example, from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they have aromatic rings, such as N,N-bis(2-hydroxyethyl)aniline or p,p'-bis(2-hydroxyethylamino)diphenylmethane.

The epoxide compounds may also derive from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone, or condensation products of phenols with formaldehyde obtained under acidic conditions, such as phenol novolacs.

Further possible terminal epoxides are, for example: glycidyl 1-naphthyl ether, glycidyl 2-phenylphenyl ether, N-(2,3-epoxypropyl)phthalimide and 2,3-epoxypropyl 4-methoxyphenyl ether.

III) N-Glycidyl compounds obtainable by dehydrochlorination of the reaction products of epichlorohydrin with amines which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

The N-glycidyl compounds also include N,N'-di-, N,N',N''-tri- and N,N',N'',N'''-tetraglycidyl derivatives of cycloalkyleneureas such as ethyleneurea or 1,3-propyleneurea, and N,N'-diglycidyl derivatives of hydantoins, such as those of 5,5-dimethylhydantoin or glycoluril and triglycidyl isocyanurate.

IV) S-Glycidyl compounds, for example di-S-glycidyl derivatives which derive from dithiols, for example ethane-1,2-dithiol or bis(4-mercaptomethylphenyl) ether.

V) Epoxide compounds having a radical of the above formula, in which Ri and R3 together are —$CH_2$—$CH_2$— and n is 0, are bis(2,3-epoxycyclopentyl) ether, 2,3-epoxycyclopentyl glycidyl ether or 1,2-bis(2,3-epoxycyclopentyloxy)ethane. An epoxy resin with a radical of the above formula, in which Ri and R3 together are —CH2—CH2— and n is 1, is, for example, (3',4'-epoxy-6'-methylcyclohexyl)methyl 3,4-epoxy-6-methylcyclohexanecarboxylate.

Suitable terminal epoxides are, for example:
a) liquid bisphenol A diglycidyl ethers such as Araldit®GY 240, Araldit®GY 250, Araldit®GY 260, Araldit®GY 266, Araldit®GY 2600, Araldit®MY 790 and Epicote® 828 (BADGE);
b) solid bisphenol A diglycidyl ethers such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610 and Epikote® 1002;
c) liquid bisphenol F diglycidyl ethers such as Araldit®GY 281, Araldit®PY 302, Araldit®PY 306 (BFDGE);
d) solid polyglycidyl ethers of tetraphenylethane such as CG Epoxy Resin®0163;
e) solid and liquid polyglycidyl ethers of phenol-formaldehyde novolac such as EPN 1138, EPN 1139, GY 1180, PY 307 (NODGE);
f) solid and liquid polyglycidyl ethers of o-cresol-formaldehyde novolac such as ECN 1235, ECN 1273, ECN 1280, ECN 1299 (NODGE);
g) liquid glycidyl ethers of alcohols, such as Shell Glyzidylether® 162, Araldit®DY 0390, Araldit®DY 0391;
h) liquid and solid glycidyl esters of carboxylic acids such as Shell Cardura® E terephthalic ester, trimellitic ester and mixtures thereof, Araldit®PY 284 and Araldit® P811;
i) solid heterocyclic epoxy resins (triglycidyl isocyanurate) such as Araldit® PT 810;
j) liquid cycloaliphatic epoxy resins such as Araldit®CY 179;
k) liquid N,N,O-triglycidyl ethers of p-aminophenol, such as Araldit®MY 0510;
l) tetraglycidyl-4,4'-methylenebenzamine or N,N,N',N'-tetraglycidyldiaminophenylmethane, such as Araldit®MY 720, Araldit®MY 721.

Preference is given to using epoxide compounds having two functional groups. However, it is also possible in principle to use epoxide compounds having one, three or more functional groups.

Predominantly epoxide compounds, in particular diglycidyl compounds, having aromatic groups are used.

If appropriate, it is also possible to use a mixture of different epoxide compounds.

The terminal epoxide compounds used are more preferably diglycidyl ethers based on bisphenols, for example of 2,2-bis(4-hydroxyphenyl)propane (bisphenol-A), bis(4-hydroxyphenyl)methane or mixtures of bis(ortho/para-hydroxyphenyl)methane (bisphenol F).

Very particular preference is given to bisglycidyl alcohol ethers of the following formula:

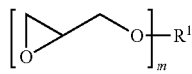

wherein m=2, 3, 4, 5 or 6.

The terminal epoxide compounds can be used in an amount of preferably at least 0.1 part, for example 0.1 to 50, appropriately 1 to 30 and especially 1 to 25 parts by weight, based on 100 parts by weight of PVC.

Epoxidized Fatty Acid Esters (and Other Epoxide Compounds)

The inventive stabilizer combination may additionally preferably comprise at least one epoxidized fatty acid ester. Useful esters for this purpose are particularly esters of fatty acids from natural sources (fatty acid glycerides), such as soybean oil or rapeseed oil. However, it is also possible to use synthetic products such as epoxidized butyl oleate. It is likewise possible to use epoxidized polybutadiene and polyisoprene, optionally also in partially hydroxylated form, or glycidyl acrylate and glycidyl methacrylate as a homo- or copolymer. These epoxy compounds may also be applied to an alumino salt compound; in this regard, see also DE 4 031 818 A1.

Liquid or high-viscosity glycidyl or epoxide compounds can also be applied to silica- or silicate-containing supports and be used in a solid, nontacky form.

Phenol Compounds

This category includes phenols and aminophenols, such as resorcinol, resorcinol monomethyl ether, phloroglucinol, 2-naphthol, 3-hydroxyaniline and 3-hydroxydiphenylamine.

Phosphites (Phosphorous Esters)

Organic phosphites are known costabilizers for chlorinated polymers. Examples are trioctyl, tridecyl, tridodecyl, tritridecyl, tripentadecyl, trioleyl, tristearyl, triphenyl, trilauryl, tricresyl, trisnonylphenyl, tris-2,4-t-butylphenyl or tricyclohexyl phosphite. Further suitable phosphites are variously mixed aryl dialkyl or alkyl diaryl phosphites such as phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl and dodecyl bis(2,4-di-t-butyl) phenyl phosphite. In addition, it is also advantageously possible to use phosphites of various di- or polyols, for example tetraphenyl dipropylene glycol diphosphite, poly(dipropylene glycol) phenyl phosphite, tetraisodecyl dipropylene glycol diphosphite, tris(dipropylene glycol) phosphite, tetramethylolcyclohexanol decyl diphosphite, tetramethylolcyclohexanol butoxyethoxyethyl diphosphite, tetramethylolcyclohexanol nonylphenyl diphosphite, bis(nonylphenyl) ditrimethylolpropane diphosphite, bis(2-butoxyethyl) ditrimethylolpropane diphosphite, trishydroxyethyl isocyanurate hexadecyl triphosphite, didecyl pentaerythrityl diphosphite, distearyl pentaerythrityl diphosphite, bis(2,4-di-t-butylphenyl)pentaerythrityl diphosphite, and mixtures of these phosphites and aryl/alkyl phosphite mixtures of the statistical composition $(H_{19}C_9-C_6H_4)O_{1.5}P(OC_{12.13}H_{25.27})_{1.5}$ or $(C_8H_{17}-C_6H_4-O-)_2P(i-C_8H_{17}O)$, $(H_{19}C_9-C_6H_4)O_{1.5}P(OC_{9.11}H_{19.23})_{1.5}$. Industrial examples are Naugard P, Mark CH300, Mark CH301, Mark CH302 and Mark CH55 (manufacturer: Crompton Corp. USA). The organic phosphites can be employed in an amount of, for example, 0.01 to 10, appropriately 0.05 to 5 and especially 0.1 to 3 parts by weight, based on 100 parts by weight of PVC.

Sterically Hindered Amines (HALS)

The sterically hindered amines are generally compounds containing the group

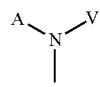

in which A and V are each independently $C_{1-8}$-alkyl, $C_{3-8}$-alkenyl, $C_{5-8}$-cycloalkyl or $C_{7-9}$-phenylalkyl, or together form C$_{2-5}$-alkylene optionally interrupted by O, NH or CH$_3$—N, or a cyclic sterically hindered amine, especially a compound from the group of the alkyl- or polyalkylpiperidines, particularly the tetramethylpiperidines containing the group

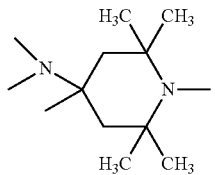

Preferred further component groups are polyols and disaccharide alcohols, β-diketones, thiophosphites and thiophosphates, and mercaptocarboxylic esters.

Polyols (and Sugar Alcohols)

Examples of useful compounds of this type include: pentaerythritol, dipentaerythritol, tripentaerythritol, trimethylolethane, bistrimethylolpropane, inositol, polyvinyl alcohol, bistrimethylolethane, trimethylolpropane, sorbitol, maltitol, isomaltitol, lycasin, mannitol, lactose, leucrose, tris(hydroxyethyl) isocyanurate, palatinitol, tetramethylcyclohexanol, tetramethylolcyclopentanol, tetramethylolpyranol, glycerol, diglycerol, polyglycerol, thiodiglycerol or 1-O-∝-D-glycopyranosyl-D-mannitol dihydrate. Preference is given to disaccharide alcohols. Also used are polyol syrups such as sorbitol syrup, mannitol syrup and maltitol syrup. The polyols can be employed in an amount of, for example, 0.01 to 20, appropriately of 0.1 to 20 and especially of 0.1 to 10 parts by weight, based on 100 parts by weight of PVC.

1,3-Diketones (and 1,3-Keto Esters)

Usable 1,3-dicarbonyl compounds are linear or cyclic dicarbonyl compounds. Preference is given to using dicarbonyl compounds of the formula R'$_1$CO CHR$_2$-COR'$_3$ in which R'$_1$ is C$_1$-C$_{22}$-alkyl, C$_5$-C$_{10}$-hydroxyalkyl, C$_2$-C$_{18}$-alkenyl, phenyl, OH—, C$_1$-C$_4$-alkyl-, C$_1$-C$_4$-alkoxy- or halogen-substituted phenyl, C$_7$-C$_{10}$-phenylalkyl, C$_5$-C$_{12}$-cycloalkyl, C$_1$-C$_4$-alkyl-substituted C$_5$-C$_{12}$-cycloalkyl or a —R'$_5$—S—R'$_6$ or —R'$_5$—O—R'$_6$ group; R'$_2$ is hydrogen, C$_1$-C$_8$-alkyl, C$_2$-C$_{12}$-alkenyl, phenyl, C$_7$-C$_{12}$-alkylphenyl, C$_7$-C$_{10}$-phenylalkyl or a —CO—R'$_4$ group; R'$_3$ has one of the definitions given for R'$_1$ or is C$_1$-C$_{18}$-alkoxy, R'$_4$ is C$_1$-C$_4$-alkyl or phenyl; R'$_5$ is C$_1$-C$_{10}$-alkylene and R'$_6$ is C$_1$-C$_{12}$-alkyl, phenyl, C$_7$-C$_{18}$-alkylphenyl or C$_7$-C$_{10}$-phenylalkyl.

These include the diketones containing hydroxyl groups, patent EP 0 346 279 A1, and the oxa- and thiadiketones in patent EP 0 307 358 A1, and likewise the isocyanuric acid-based keto esters in patent U.S. Pat. No. 4,339,383.

R'$_1$ and R'$_3$ as alkyl may especially be C$_1$-C$_{18}$-alkyl, for example methyl, ethyl, n-propyl, isopropyl, n-butyl, tert-butyl, pentyl, hexyl, heptyl, octyl, decyl, dodecyl or octadecyl.

R'$_1$ and R'$_3$ as hydroxyalkyl are especially a —(CH$_2$)$_n$—OH group in which n is 5, 6 or 7.

R'$_1$ and R'$_2$ as alkenyl may, for example, be vinyl, allyl, methallyl, 1-butenyl, 1-hexenyl or oleyl, preferably allyl.

R'$_1$ and R'$_3$, as OH—, alkyl-, alkoxy- or halogen-substituted phenyl, may, for example, be tolyl, xylyl, tert-butylphenyl, methoxyphenyl, ethoxyphenyl, hydroxyphenyl, chlorophenyl or dichlorophenyl.

R'$_1$ and R'$_3$ as phenylalkyl are especially benzyl. R'$_2$ and R'$_3$ as cycloalkyl or alkylcycloalkyl are especially cyclohexyl or methylcyclohexyl.

R'$_2$ as alkyl may especially be C$_1$-C$_4$-alkyl. R'$_2$ as C$_2$-C$_{12}$-alkenyl may especially be allyl. R'$_2$ as alkylphenyl may especially be tolyl. R'$_2$ as phenylalkyl may especially be benzyl. R'$_2$ is preferably hydrogen. R'$_3$ as alkoxy may, for example, be methoxy, ethoxy, butoxy, hexyloxy, octyloxy, dodecyloxy, tridecyloxy, tetradecyloxy or octadecyloxy. R'$_5$ as C$_1$-C$_{10}$-alkylene is especially C$_2$-C$_4$-alkylene. R'$_6$ as alkyl is especially C$_4$-C$_{12}$-alkyl, for example butyl, hexyl, octyl, decyl or dodecyl.

R'$_6$ as alkylphenyl is especially tolyl. R'$_6$ as phenylalkyl is especially benzyl.

Examples of 1,3-dicarbonyl compounds of the above general formula and the alkali metal, alkaline earth metal and zinc chelates thereof are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl) methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, biscyclohexanoylmethane, di pivaloylmethane, 2-acetylcyclopentanone, 2-benzoylcyclopentanone, methyl, ethyl and allyl diacetoacetate, methyl and ethyl benzoyl-, propionyl- and butyrylacetoacetate, triacetylmethane, methyl, ethyl, hexyl, octyl, dodecyl or octadecyl acetoacetate, methyl, ethyl, butyl, 2-ethylhexyl, dodecyl or octadecyl benzoylacetate, and C$_1$-C$_{18}$-alkyl propionyl- and butyrylacetate, ethyl, propyl, butyl, hexyl or octyl stearoylacetate, and polycyclic β-keto esters as described in patent EP-A 0 433 230, and dehydroacetic acid and the zinc, magnesium or alkali metal salts thereof. Preference is given to calcium, magnesium and zinc salts of acetylacetone and of dehydroacetic acid.

Particular preference is given to 1,3-diketo compounds of the above formula in which R'$_1$ is C$_1$-C$_{18}$-alkyl, phenyl, OH—, methyl- or methoxy-substituted phenyl, C$_7$-C$_{10}$-phenylalkyl or cyclohexyl, R'$_2$ is hydrogen and R'$_3$ has one of the definitions given for R'$_1$. These likewise include heterocyclic 2,4-diones such as N-phenyl-3-acetylpyrrolidine-2,4-dione. Further representatives of this category are described in patent EP 0 734 414 A1. The 1,3-diketo compounds can be employed in an amount of, for example, 0.01 to 10, appropriately 0.01 to 3 and especially 0.01 to 2 parts by weight, based on 100 parts by weight of PVC.

Thiophosphites (and Thiophosphates)

Thiophosphites or thiophosphates are understood to mean compounds of the general type (RS)$_3$P, (RS)$_3$P=O or (RS)$_3$P=S, as described in the patent applications DE 28 09 492 A1, EP 0 090 770 A1 and EP 0 573 394 A1. Examples of these compounds are trithiohexyl phosphite, trithiooctyl phosphite, trithiolauryl phosphite, trithiobenzyl phosphite, tris(carbo-i-octyloxy)methyl trithiophosphite, tris(carbotrimethylcyclohexyloxy)methyl trithiophosphite, S,S,S-tris(carbo-i-octyloxy)methyl trithiophosphate, S,S,S-tris(carbo-2-ethylhexyloxy)methyl trithiophosphate, S,S,S-tris-1-(carbohexyloxy)ethyl trithiophosphate, S,S,S-tris-1-(carbo-2-ethylhexyloxy)ethyl trithiophosphate, S,S,S-tris-2-(carbo-2-ethyl hexyloxy)ethyl trithiophosphate.

Mercaptocarboxylic Esters

Examples of these compounds are esters of thioglycolic acid, thiomalic acid, mercaptopropionic acid, the mercaptobenzoic acids or thiolactic acid, mercaptoethyl stearate and oleate, as described in patent publications FR-A 2 459 816, EP 0 090 748 A1, FR-A 2 552 440, EP 0 365 483 A1. The mercaptocarboxylic esters also include polyol esters or partial esters thereof.

Further additives can be added to the stabilizers:
fillers
lubricants
plasticizers
pigments
antioxidants
UV absorbers
optical brighteners
blowing agents
antistats It is additionally possible for further additives such as biocides (antimicrobials), antifogging agents, impact modifiers, processing aids, gelling agents, flame retardants, metal deactivators, compatibilizers, adhesives, calendaring aids, mold release agents, lubricants, and fragrances and colorants, to be present. Examples of such additional components are detailed and explained below (cf. "Handbook of PVC-Formulating" by E. J. Wickson, John Wiley & Sons, New York 1993).

Fillers

For example, calcium carbonate, dolomite, wollastonite, magnesium oxide, magnesium hydroxide, silicates, china clay, talc, glass fibers, glass beads, sawdust, mica, metal oxides or metal hydroxides, carbon black, graphite, rock flour, barite, glass fibers, kaolin and chalk are used. Preference is given to chalk (including coated chalk) (HANDBOOK OF PVC FORMULATING E. J. Wickson, John Wiley & Sons, 1993, p. 393-449) and reinforcing agents (TASCHENBUCH DER KUNSTSTOFFADDITIVE [HANDBOOK OF PLASTICS ADDITIVES], R. Gachter & H. Müller, Carl Hanser, 1990, p. 549-615).

The fillers can be used in an amount of preferably at least 1 part, for example 5 to 200, appropriately 5 to 150 and especially 5 to 100 parts by weight, based on 100 parts by weight of PVC.

Lubricants

Examples of useful lubricants include: montan waxes, fatty acid esters, PE and PP waxes, amide waxes, chloroparaffins, glyceryl esters or alkaline earth metal soaps, and also fatty ketones and combinations thereof, as detailed in patent EP 0 259 783 A1. Preference is given to calcium stearate.

Plasticizers

Examples of useful organic plasticizers include those from the following groups:
(i) phthalic esters such as preferably di-2-ethylhexyl, diisononyl and diisodecyl phthalate, which are also known by the commonly used abbreviations DOP (dioctyl phthalate, di-2-ethylhexyl phthalate), DINP (diisononyl phthalate), DIDP (diisodecyl phthalate)
(ii) esters of aliphatic dicarboxylic acids, especially esters of adipic acid, azelaic acid and sebacic acid, preferably di-2-ethylhexyl adipate and diisooctyl adipate
(iii) trimellitic esters, for example tri-2-ethylhexyl trimellitate, triisodecyl trimellitate (mixture), triisotridecyl trimellitate, triisooctyl trimellitate (mixture), and tri-$C_6$-$C_8$-alkyl, tri-$C_6$-$C_{10}$-alkyl, tri-$C_7$-$C_9$-alkyl and tri-$C_9$-$C_{11}$-alkyl trimellitates; commonly used abbreviations are TOTM (trioctyl trimellitate, tri-2-ethylhexyl trimellitate), TIDTM (triisodecyl trimellitate) and TITDTM (triisotridecyl trimellitate)
(iv) epoxy plasticizers; these are mainly epoxidized unsaturated fatty acids, for example epoxidized soybean oil
(v) polymer plasticizers: the most commonly used starting materials for the production thereof are dicarboxylic acids such as adipic acid, phthalic acid, azelaic acid and sebacic acid; diols such as 1,2-propanediol, 1,3-butanediol, 1,4-butanediol, 1,6-hexanediol, neopentyl glycol and diethylene glycol (see ADMEX® products from Velsicol Corp. and PX-811 from Asahi Denka)
(vi) phosphoric esters: a definition of these esters can be found in the previously mentioned "TASCHENBUCH DER KUNSTSTOFFADDITIVE" chapter 5.9.5, p. 408-412. Examples of such phosphoric esters are tributyl phosphate, tri-2-ethylbutyl phosphate, tri-2-ethylhexyl phosphate, trichloroethyl phosphate, 2-ethylhexyl diphenylphosphate, cresyl diphenylphosphate, triphenyl phosphate, tricresyl phosphate and trixylenyl phosphate; preference is given to tri-2-ethylhexyl phosphate and Reofos® 50 and 95 (Ciba Spezialitatenchemie)
(vii) chlorinated hydrocarbons (paraffins)
(viii) hydrocarbons
(ix) monoesters, for example butyl oleate, phenoxyethyl oleate, tetrahydrofurturyl oleate and alkylsulfonic esters
(x) glycol esters, for example diglycol benzoates
(xi) citric esters, for example tributyl citrate and acetyltributyl citrate, as described in patent WO 02/05206
(xii) perhydrophthalic, -isophthalic and -terephthalic esters and perhydroglycol and -diglycol benzoate esters; preference is given to perhydrodiisononyl phthalate (Hexamoll® DINCH—manufacturer: BASF), as described in patents DE 197 56 913 A1, DE 199 27 977 A1, DE 199 27 978 A1 and DE 199 27 979 A1.
(xiii) castor oil-based plasticizers (Soft-N-Safe®, manufacturer: DANISCO)
(xiv) ketone-ethylene-ester terpolymers, Elvaloy® KEE (Elvaloy® 741, Elvaloy® 742, manufacturer: DuPont)

Trimellitic esters are most preferred.

A definition of these plasticizers and examples thereof are given in "TASCHENBUCH DER KUNSTSTOFFADDITIVE", R. Gachter/H. Müller, Carl Hanser Verlag, 3rd ed., 1989, chapter 5.9.6, pages 412-415, and in "PVC TECHNOLOGY", W.V. Titow, $4^{th}$. Ed., Elsevier Publ., 1984, pages 165-170. It is also possible to use mixtures of different plasticizers. The plasticizers can be employed in an amount of, for example, 5 to 50 parts by weight, appropriately 10 to 45 parts by weight, based on 100 parts by weight of PVC. Rigid or semirigid PVC contains preferably up to 20%, more preferably up to 5% or no plasticizer.

Pigments

Suitable substances are known to those skilled in the art. Examples of inorganic pigments are $TiO_2$, pigments based on zirconium oxide, $BaSO_4$, zinc oxide (zinc white) and lithopone (zinc sulfide/barium sulfate), carbon black, carbon black-titanium dioxide mixtures, iron oxide pigments, $Sb_2O_3$, $(Ti,Ba,Sb)O_2$, $Cr_2O_3$, spinels such as cobalt blue and cobalt green, Cd(S,Se), ultramarine blue. Organic pigments are, for example, azo pigments, phthalocyanine pigments, quinacridone pigments, perylene pigments, diketopyrrolopyrrole pigments and anthraquinone pigments. Preference is also given to $TiO_2$ in micronized form. A definition and further descriptions can be found in the "HANDBOOK OF PVC FORMULATING", E. J. Wickson, John Wiley & Sons, New York, 1993.

Antioxidants

These include sterically hindered phenol, such as alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ethers, e.g. 2,2'-thiobis(6-tert-butyl-4-methylphenol), alkylidene bisphenols, e.g. 2,2'-methylenebis(6-tert-butyl-4-methylphenol), benzyl compounds, e.g. 3,5,3',5'-tetra-tert-butyl-4,4'-dihydroxydibenzyl ether, hydroxybenzylated malonates, e.g. dioctadecyl 2,2-bis(3,5-di-tert-butyl-2-hydroxybenzyl)malonate, hydroxybenzylaromatics, e.g. 1,3,5-tris(3,5-di-tert-butyl-4-hydroxybenzyl)-2,4,6-trimethylbenzene, triazine compounds, e.g. 2,4-bisoctylmercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, azylaminophenols, e.g. 4-hydroxylauranilide, esters of beta-(3,5-di-tert-butyl-4-hydroxyphenyl)propionic acid, of beta-(5-tert-butyl-4-hydroxy-3-methylphenyl) propionic acid, of beta-(3,5-dicyclohexyl-4-hydroxyphenyl) propionic acid, esters of 3,5-di-tert-butyl-4-hydroxyphenylacetic acid with mono- or polyhydric alcohols, amides of beta-(3,5-di-tert-butyl-4-hydroxyphenyl) propionic acid, e.g. N,N'-bis(3,5-di-tert-butyl-4-hydroxyphenylpropionyl)hexamethylenediamine, vitamin E (tocopherol) and derivatives, and D,L-ascorbic acid. The antioxidants can be employed in an amount of, for example, 0.01 to 10 parts by weight, appropriately 0.1 to 10 parts by weight and especially 0.1 to 5 parts by weight, based on 100 parts by weight of PVC.

UV absorbers (and Light Stabilizers)

Examples thereof are 2-(2'-hydroxyphenyl)benzotriazoles, e.g. 2-(2'-hydroxy-5'-methylphenyl)benzotriazole,2-hydroxybenzophenones, esters of optionally substituted benzoic acids, e.g. 4-tert-butylphenyl salicylate, phenyl salicylate, acrylates, nickel compounds, oxalamides, e.g. 4,4'-dioctyloxyoxanilide, 2,2'-dioctyloxy-5,5'-di-tert-butyloxanilide, 2-(2-hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, sterically hindered amines based on tetramethylpiperidine or tetramethylpiperazinone or tetramethylmorpholinone, e.g. bis(2,2,6,6-tetramethylpiperidin-4-yl) sebacate, bis(2,2,6,6-tetramethylpiperidin-4-yl) succinate, and benzoxazinones such as 1,4-bisbenzoxazinonylbenzene.

Optical Brighteners

Examples thereof are bisbenzene-(1,4)-oxazoles, phenylcoumarins and bisstyrylbiphenyls, such as 4-methyl-7-diethylaminocoumarin, 3-phenyl-7-(4-methyl-6-butoxybenzoxazolyl)coumarin, 4,4'-bis(benzoxazol-2-yl)stilbene and 1,4-bis(benzoxazol-2-yl)naphthalene. Preference is given to solutions of optical brighteners in a plasticizer, for example DOP.

Blowing Agents

Blowing agents are, for example, organic azo and hydrazo compounds, tetrazoles, oxazines, isatoic anhydride, N-methylisatoic anhydride, and soda and sodium bicarbonate. Preference is given to azodicarbonamide and sodium bicarbonate, and mixtures thereof. Very particular preference is given to isatoic anhydride or N-methylisatoic anhydride, especially in flexible PVC or semirigid PVC.

Antistats

Antistats are divided into nonionic(a), anionic(b), cationic (c) and amphoteric(d) classes. (a) includes fatty acid ethoxylates, fatty acid esters, ethoxylated fatty alkylamines, fatty acid diethanolamides and ethoxylated phenols and alcohols, and polyglycol fatty acid monoesters. (b) includes alkali metal fatty alkanesulfonates and phosphoric acid fatty alcohol bisester alkali metal salts. (c) includes quaternary fatty alkylammonium salts, and (d) includes fatty alkyl betaines and fatty alkyl imidazoline betaines. Individual preferred compounds are lauric acid diethanolamide, myristyldiethanolamine, sodium octadecylsulfonate and sodium bisoctadecylphosphate. The presence of component (D) in many cases permits, due to the inherent properties, a reduction in the amount of expensive antistats used.

Definitions and examples of further additives such as impact modifiers and processing aids, gelling agents, biocides, metal deactivators, flame retardants, antifogging agents and compatibilizers are described in "HANDBUCH DER KUNSTSTOFFADDITIVE", R. Gachter/H. Müller, Carl Hanser Verlag, 3rd ed., 1989, and 4th ed. 2001, and in "HANDBOOK OF POLYVINYL CHLORIDE FORMULATING" E. J. Wickson, J. Wiley & Sons, 1993, and in "PLASTICS ADDITIVES" G. Pritchard, Chapman & Hall, London, 1st Ed., 1998. Impact modifiers are also described in detail in "IMPACT MODIFIERS FOR PVC", J. T. Lutz/D. L. Dunkelberger, John Wiley & Sons, 1992.

According to the present invention, in addition to the primary thermal stabilizer and the additives, a sufficient amount of a composition comprising aqueous metal perchlorate salt solution and calcined dolomite is used to improve the stability of the synthetic polymer to impairments of physical properties resulting from prolonged exposure at moderate temperatures, for example those that motor vehicle components undergo in operation.

The stabilizer systems of the invention, which comprise thermal stabilizers and long-term thermal stabilizers, can be compounded with polyvinyl chloride resins, formulated and shaped by standard polymer processing operations, at processing temperatures of 150 to 205° C., for example calendaring, extrusion, injection molding and compression molding, blow molding, rotary molding, hollow casting and dip molding, casting in solution, electrostatic spray and fluidized bed coating, in order to produce a multitude of motor vehicle components for interior and exterior use, for example dashboards, seat covers, floor mats, door panels, armrests and headrests, containers, compartments, body-fitting moldings, window frame moldings, seat corners and head strips, door and window knobs, and impact-resistant dashboards. Compounding components, for example plasticizers, lubricants, impact modifiers, processing aids, fillers, dyes, antistats, adhesives, flame retardants, fungicides and antiblocking agents, can be incorporated in order to simplify the processing of such motor vehicle components.

The present invention further provides a composition comprising a halogenated polymer and an inventive stabilizer system.

The present invention also provides for the use of the inventive stabilizer system for stabilization of a halogenated, especially chlorinated, polymer.

The amount of the inventive stabilizer system, based on the halogenated polymer, is preferably 0.1 to 50% by weight, more preferably 0.1 to 30% by weight, more preferably 0.1 to 20% by weight.

The halogenated polymer is preferably a chlorinated polymer such as polyvinyl chloride (PVC). Additionally preferably, the halogenated polymer is a rigid PVC, flexible PVC or PVC paste. Likewise preferably, the halogenated polymer is a recycled polymer.

Examples of the chlorinated polymers to be stabilized are polymers of vinyl chloride, vinylidene chloride, vinyl resins containing vinyl chloride units, such as copolymers of vinyl chloride and vinyl esters of aliphatic acids, especially vinyl acetate, copolymers of vinyl chloride with esters of acrylic acid and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and other substances, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and dichlorodivinyl ether; chlorinated polymers of vinyl acetate; chlorinated polymeric esters of acrylic acid and of a-substituted acrylic acid; polymers of chlorinated styrenes, for example dichlorostyrene; chloro rubbers; chlorinated polymers of ethylene; polymers and postchlorinated polymers of chlorobutadiene and copolymers thereof with vinyl chloride, chlorinated natural and synthetic rubbers, and mixtures of the polymers mentioned with one another and with other polymerizable compounds. In the context of this invention, PVC is also understood to mean copolymers of vinyl chloride with polymerizable compounds such as acrylonitrile, vinyl acetate or ABS, and these may be suspension, bulk or emulsion polymers.

Preference is given to a PVC homopolymer, also in combination with polyacrylates or polymethacrylates.

In addition, graft polymers of PVC with EVA, ABS and MBS are also useful, as are graft polymers of PVC with PMMA. Preferred substrates are also mixtures of the aforementioned homo- and copolymers, especially vinyl chloride homopolymers, with other thermoplastic or/and elastomeric polymers, especially blends with ABS, MBS, NBR, SAN, EVA, CPE, MBAS, PMA, PMMA, EPDM and polylactones, especially from the group of ABS, NBR, NAR, SAN and EVA. The abbreviations used for the copolymers are familiar to those skilled in the art and have the following meanings: ABS acrylonitrile-butadiene-styrene; SAN styrene-acrylonitrile; NBR acrylonitrile-butadiene; NAR acrylonitrile-acrylate; EVA ethylene-vinyl acetate. More particularly, styrene-acrylonitrile copolymers based on acrylate (ASA) are also useful. Preferred components in this context are polymer compositions which comprise, as components (i) and (ii), a mixture of 25-75% by weight of PVC and 75-25% by weight of the copolymers mentioned. Components of particular significance are compositions of (i) 100 parts by weight of PVC and (ii) 0-300 parts by weight of ABS and/or SAN-modified ABS and 0-80 parts by weight of the copolymers NBR, NAR and/or EVA, but especially EVA.

Additionally useful for stabilization in the context of this invention are also recycled chlorinated polymers, which are the polymers which have been described in detail above and which have been damaged by processing, use or storage. Particular preference is given to recycled PVC. A further use of the inventive stabilizer system is based on the fact that antistatic properties can be imparted to the finished article made from rigid or flexible PVC. In this way, it is possible to reduce the use of expensive antistats. For this application, preference is given to flexible PVC or semirigid PVC.

The present invention further relates to articles comprising an inventive composition. These are preferably consumer articles. Examples thereof are wood-plastic composites (WPCs), films, profiles, floor coverings, automobile parts, wallpaper, hoses, injection moldings or wire sheathing (cables).

The present invention further relates to the use of an inventive composition for production of an inventive article.

The invention further provides consumer goods (consumer articles) which comprise especially PVC and inventive stabilizer systems.

The inventive compositions are especially suitable, in the form of rigid formulations, for hollow bodies (bottles), packaging films (thermoforming films), blown films, "crash pad" films (automobiles), tubes, foams, heavy profiles (window frames), translucent wall profiles, construction profiles, films, blister packs (including those produced by the Luvitherm process), profiles, sidings, fittings, office films, margarine tubs, packaging for chocolates, and apparatus housings, insulators, computer housings and constituents of domestic appliances, and for electronics applications, especially in the semiconductor sector. They are very particularly suitable for production of window profiles with high whiteness and surface shine.

Preferred other compositions in the form of semirigid and flexible formulations are for wire sheathing, cable insulation, decorative films, roof films, foams, agricultural films, hoses, sealing profiles, floors, wallpaper, automobile parts, flexible films, injection moldings (blow molding), office films and films for air-inflated structures. Examples for the use of the inventive compositions in the form of plastisols are toys (rotary molding), synthetic leather, floors, textile coatings, wallpaper, coil coatings and underbody protection for motor vehicles; examples of sintered PVC applications of the inventive compositions are slush, slush mold and coil coatings, and in E-PVC for films produced by the Luvitherm process. For further details in this regard see "Kunststoffhandbuch PVC" [Plastics Handbook, PVC], volume 2/2, W. Becker/H. Braun, 2nd ed. 1985, Carl Hanser Verlag, p. 1236-1277.

Preference is also given to the use of consumer articles which feature a particularly fine foam structure. This applies to rigid, flexible and semirigid PVC. This aspect is particularly important in the case of wallpaper and floors made of flexible PVC, where Zn or Sn stabilizers are used as kickers to achieve a fine foam.

The example which follows illustrates the utility of the present invention.

EXAMPLE

I. Supporting Procedure 450.0 g of the support substance are mixed vigorously with 71.4 g of a 70% aqueous sodium perchlorate solution. The result is a white powder in quantitative yield (the extent of sodium perchlorate supporting is 9.6%).

II. Production of the Milled Sheet:

The mixtures prepared according to Table 1 are plasticized at the temperature specified on a Polymix150P test roll mill (from Schwabenthan) for 5 minutes in each case, 10 rpm, friction: -10%. The films thus obtained (thickness 1.0 mm) are sent to further measurements.

TABLE 1

| | Formulations | | | |
|---|---|---|---|---|
| Components | 1 | 2 | 3 | 4 |
| PVC (Evipol SH6830) K value = 68 | 150 | 150 | 150 | 150 |
| Titanium dioxide | 3.8 | 3.8 | 3.8 | 3.8 |
| Chalk (Polcarb SB) | 6.6 | 6.6 | 6.6 | 6.6 |
| Impact modifier (Kane PA 630) | 7.2 | 7.2 | 7.2 | 7.2 |
| Stearyl stearate (lubricant 1) | 0.4 | 0.4 | 0.4 | 0.4 |
| PE wax (lubricant 2) | 0.3 | 0.3 | 0.3 | 0.3 |
| Processing aid | 0.7 | 0.7 | 0.7 | 0.7 |
| Calcium stearate | 0.6 | 0.6 | 0.6 | 0.6 |
| Lead stearate | 0.2 | 0.2 | 0.2 | 0.2 |
| Dibasic lead phosphite | 2.5 | 2.5 | 2.5 | 2.5 |
| Costabilizer | 0.1 | 0.1 | 0.1 | 0.1 |
| Pigments | 0.12 | 0.12 | 0.12 | 0.12 |
| Calc. dolomite (Ce_Mix_115) supported with sodium perchlorate (inventive) | 0.2 | — | 0.5 | — |

TABLE 1-continued

| | Formulations | | | |
|---|---|---|---|---|
| Components | 1 | 2 | 3 | 4 |
| Actilox CAHC supported with sodium perchlorate (prior art) | — | 0.2 | — | 0.5 |

III. Performance of the Dehydrochlorination Measurements (DHC):

The DHC is a measure of the elimination of HCl from PVC, which takes place under thermal stress. The hydrochloric acid eliminated is flushed with nitrogen gas into a reservoir containing dist. water and the rise in the conductivity is measured therein in microsiemens per centimeter (pS/cm). The characteristics used are the corresponding minute values [min] which are summarized in a table. The longer the time interval to achieve a particular conductivity, the greater the thermal stability of the PVC sample.

Instrument: PVC Thermomat 763 (from Metrohm)

The measurements are effected to DIN 53381 part 1, method B: conductivity measurement.

Parameters: Sample weight: 500±0.5 mg (chips of milled sheet)

Temperature: ° C. (as specified in the examples)

Flow: 7 l/h (nitrogen 5.0)

Absorption vol.: 60 ml (demineralized water)

Evaluation: Stability time, $t_{50}$ (conductivity of 50 μS/cm—figure in minute values)

IV. Results

TABLE 2

| | Thermal stability in minutes |
|---|---|
| Formulations | Stability in minutes [$t_{50}$ values] |
| 1 | 64 |
| 2 | 56 |
| 3 | 92 |
| 4 | 61 |

As can be inferred from Tab. 2, the inventive formulations 1 and 3 (different concentrations of supported product) are significantly better than formulations 2 and 4 according to the prior art.

What is claimed is:

1. A stabilizer system comprising a thermal stabilizer and a supported, at least partly calcined dolomite of the formula:

$$Mt^1X^1*CaX^2$$

where $Mt^1$=Mg or Zn;

$X^1$=O or $(OH)_2$;

$X^2$=O $(OH)_2$ or $CO_3$, wherein the calcined dolomite has been supported with a metal perchlorate of the formula $$Mt^2(ClO_4)_m*nH_2O$$

where $Mt^2$=Li, Na, K, Mg, Ca, Ba, Zn, Al, La, Ce;

m=1, 2 or 3, m being selected so as to compensate for the charge of the metal ion $Mt^2$;

n=0 to 3, and wherein the stabilizer system does not comprise any of the compounds selected from the group consisting of (B) and (C) when $Mt^1$ is Mg, and wherein (B) is at least one nitrogen-containing organic compound and is selected from the group consisting of (B1) and (B2), (B1) being a tert-alkanolamine and (B2) being an enaminone or a urea, and (C) is an alkaline earth metal aluminohydroxocarbonate of the formula (C)

$$(M_{1-x}Zn_x)_yAl_2(OH)_{4+2y}CO_3*zH_2O \qquad (C)$$

where M =magnesium or/and calcium; x =0 to 0.5; y =2 to 8 and z =0 to 12.

2. The stabilizer system as claimed in claim 1, characterized in that the stabilizer is a metal-containing stabilizer.

3. The stabilizer system as claimed in claim 2, characterized in that the metal-containing stabilizer is an organotin stabilizer or a lead stabilizer, a calcium/zinc stabilizer or a barium-zinc stabilizer.

4. The stabilizer system as claimed in claim 1, characterized in that the calcined dolomite is a calcined magnesium dolomite.

5. The stabilizer system as claimed in claim 1, characterized in that the calcined dolomite is calcium magnesium oxide (MgO*CaO).

6. The stabilizer system as claimed in claim 1, characterized in that the metal perchlorate is sodium perchlorate.

7. The stabilizer system as claimed in claim 1, characterized in that the proportion of the supported calcined dolomite is 0.001 to 30% by weight, based on the total amount of the stabilizer system.

8. A composition comprising a halogenated polymer and a stabilizer system as claimed in claim 1.

9. An article comprising a composition as claimed in claim 8.

10. A method of using a stabilizer system as claimed in claim 1 for stabilization of a halogenated polymer, said method comprising adding said stabilizer system to a halogenated polymer.

11. A process for producing a calcined supported dolomite as defined in claim 1, comprising the steps of (a) providing an at least partly calcined dolomite of the formula $Mt^1X^1*CaX^2$ where $Mt^1$=Mg or Zn;

$X^1$=O or $(OH)_2$;

$X^2$=O; $(OH)_2$ or $CO_3$;

(b) supporting the dolomite with an aqueous metal perchlorate solution, the metal perchlorate having the formula $$Mt^2(ClO_4)_m*nH_2O$$

where $Mt^2$ =Li, Na, K, Mg, Ca, Ba, Zn, Al, La, Ce;

m =1, 2 or 3, m being selected so as to compensate for the charge of the metal ion $Mt^2$;

n =0 to 3

(c) optionally drying the supported dolomite.

12. The process as claimed in claim 11, wherein the metal perchlorate content of the aqueous solution is 5 to 80% by weight.

13. The process as claimed in claim 12, wherein the proportion of the metal perchlorate solution is 1 to 60% by weight, based on the total weight of the supported dolomite.

* * * * *